United States Patent
Takano et al.

(10) Patent No.: US 10,581,288 B2
(45) Date of Patent: Mar. 3, 2020

(54) ROTOR AND ROTARY ELECTRICAL MACHINE

(71) Applicant: FANUC CORPORATION, Yamanashi (JP)

(72) Inventors: Shinobu Takano, Yamanashi (JP); Takafumi Kajiya, Yamanashi (JP); Kenji Kawai, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 14 days.

(21) Appl. No.: 16/009,252

(22) Filed: Jun. 15, 2018

(65) Prior Publication Data

US 2019/0036404 A1 Jan. 31, 2019

(30) Foreign Application Priority Data

Jul. 26, 2017 (JP) ................. 2017-144551

(51) Int. Cl.
*H02K 1/27* (2006.01)
*H02K 1/28* (2006.01)
*H02K 1/30* (2006.01)
*H02K 1/20* (2006.01)
*H02K 5/20* (2006.01)

(52) U.S. Cl.
CPC .............. *H02K 1/30* (2013.01); *H02K 1/278* (2013.01); *H02K 1/28* (2013.01); *H02K 1/20* (2013.01); *H02K 5/20* (2013.01); *H02K 2213/03* (2013.01)

(58) Field of Classification Search
CPC .................. H02K 1/28; H02K 1/30

USPC .............. 310/156.01, 156.12, 156.31
See application file for complete search history.

(56) References Cited

U.S. PATENT DOCUMENTS

2014/0300233 A1* 10/2014 Arimatsu ............. H02K 1/278
310/156.12

FOREIGN PATENT DOCUMENTS

| JP | H08-107641 A | | 4/1996 |
|----|----|----|----|
| JP | H10-243586 A | | 9/1998 |
| JP | 2001-169487 A | | 6/2001 |
| JP | 2001169487 A | * | 6/2001 |
| JP | 2005-312250 A | | 11/2005 |
| JP | 2017-50925 A | | 3/2017 |
| WO | 2012/090737 A1 | | 7/2012 |

OTHER PUBLICATIONS

Machine Translation, NAKANO, JP-2001169487-A, Jun. 2001. (Year: 2001).*

(Continued)

*Primary Examiner* — Thomas Truong
(74) *Attorney, Agent, or Firm* — Studebaker & Brackett PC

(57) ABSTRACT

A rotor includes: a rotary member; permanent magnets in a plurality of columns which are arranged along the circumferential direction of the rotary member and each of which is divided into a plurality of permanent magnets in a rotary axis direction X of the rotary member; and a sheath tube which is fitted to the outer circumferential side of the permanent magnets, which covers the permanent magnets and which is formed of a fiber-reinforced plastic, and the sheath tube is divided, in the rotary axis direction X of the rotary member, by a division number which exceeds the division number of the permanent magnets.

5 Claims, 7 Drawing Sheets

(56) References Cited

OTHER PUBLICATIONS

An Office Action; "Notice of Reasons for Refusal," issued by the Japanese Patent Office dated Apr. 16, 2019, which corresponds to Japanese Patent Application No. 2017-144551 and is related to U.S. Appl. No. 16/009,252; with English Translation.

* cited by examiner

ROTOR AND ROTARY ELECTRICAL MACHINE

This application is based on and claims the benefit of priority from Japanese Patent Application No. 2017-144551, filed on Jul. 26, 2017, the content of which is incorporated herein by reference.

BACKGROUND OF THE INVENTION

Field of the Invention

The present invention relates to a rotor and a rotary electrical machine including such a rotor.

Related Art

As one type of motor using a permanent magnet as a rotor, an SPM (Surface Permanent Magnet) type motor is known in which a permanent magnet is arranged on the outer circumferential side of a rotary member (such as a sleeve or a rotary axis). In the SPM type motor, in order to reduce the dropping off of the permanent magnet from the rotor by centrifugal force at the time of high-speed rotation, a cylindrical sheath tube (protective tube) is fitted on the outer circumferential side of the rotor. As the material of the sheath tube, a fiber-reinforced plastic (FRP), in particular, a carbon fiber-reinforced plastic (hereinafter also referred to as a "CFRP") is widely used, because it has high strength and light weight. Conventionally, as a method of fitting a sheath tube formed of a CFRP to the outer circumferential side of a rotary member on which a permanent magnet is arranged, cold fitting is mainly used (see, for example, Patent Documents 1 and 2).

Patent Document 1: Japanese Unexamined Patent Application, Publication No. H08-107641
Patent Document 2: Japanese Unexamined Patent Application, Publication No. 2005-312250

SUMMARY OF THE INVENTION

In a rotor, in order to reduce an eddy current loss produced by the action of a magnetic field, permanent magnets are divided and arranged along the direction of a rotary axis in a rotary member. However, since it is difficult to uniformly form the thicknesses of permanent magnets, when a plurality of permanent magnets are arranged on the outer circumferential side of a rotor, a variation in the outside diameter of the rotor including the permanent magnets may be produced. When a variation in the outside diameter of the rotor is produced, in a sheath tube fitted to the outer circumferential side of the rotor, a force for holding the permanent magnets is unequal. Hence, it is required that a plurality of permanent magnets arranged on the outer circumferential side of a rotary member can be more securely held.

An object of the present invention is to provide a rotor and a rotary electrical machine which can more securely hold a plurality of permanent magnets arranged on the outer circumferential side of a rotary member.

(1) The present invention relates to a rotor (for example, a rotor 30 which will be described later) that includes: a rotary member (for example, a sleeve 31 which will be described later); permanent magnets (for example, permanent magnets 32 which will be described later) in a plurality of columns which are arranged along a circumferential direction of the rotary member and each of which is divided into a plurality of permanent magnets in a rotary axis direction (for example, a rotary axis direction X which will be described later) of the rotary member; and a sheath tube (for example, a sheath tube 33 which will be described later) which is fitted to an outer circumferential side of the permanent magnets, which covers the permanent magnets and which is formed of a fiber-reinforced plastic, where the sheath tube is divided, in the rotary axis direction of the rotary member, by a division number which exceeds a division number of the permanent magnets.

(2) In the rotor of (1), at least one of the divided sheath tubes covers a boundary portion of the divided permanent magnets.

(3) In the rotor of (2), the length (for example, lengths L1 to L6 which will be described later) of each of the divided sheath tubes in the rotary axis direction is less than the length (for example, lengths LM1 to LM3 which will be described later) of each of the divided permanent magnets in the rotary axis direction.

(4) In the rotor of any one of (1) to (3), the lengths of the divided sheath tubes in the rotary axis direction are equal to each other.

(5) In the rotor of any one of (1) to (4), at least one end portion of the sheath tube in the rotary axis direction protruded outward with respect to one end portion of the permanent magnet in the rotary axis direction.

(6) The present invention relates to a rotary electrical machine (for example, a motor 1 which will be described later) that includes: the rotor of any one of (1) to (5); and a stator (for example, a stator 20 which will be described later) which is provided on the outer circumferential side of the rotor.

According to the present invention, it is possible to provide a rotor and a rotary electrical machine which can more securely hold a plurality of permanent magnets arranged on the outer circumferential side of a rotary member.

DETAILED DESCRIPTION OF THE INVENTION

Figure 1:
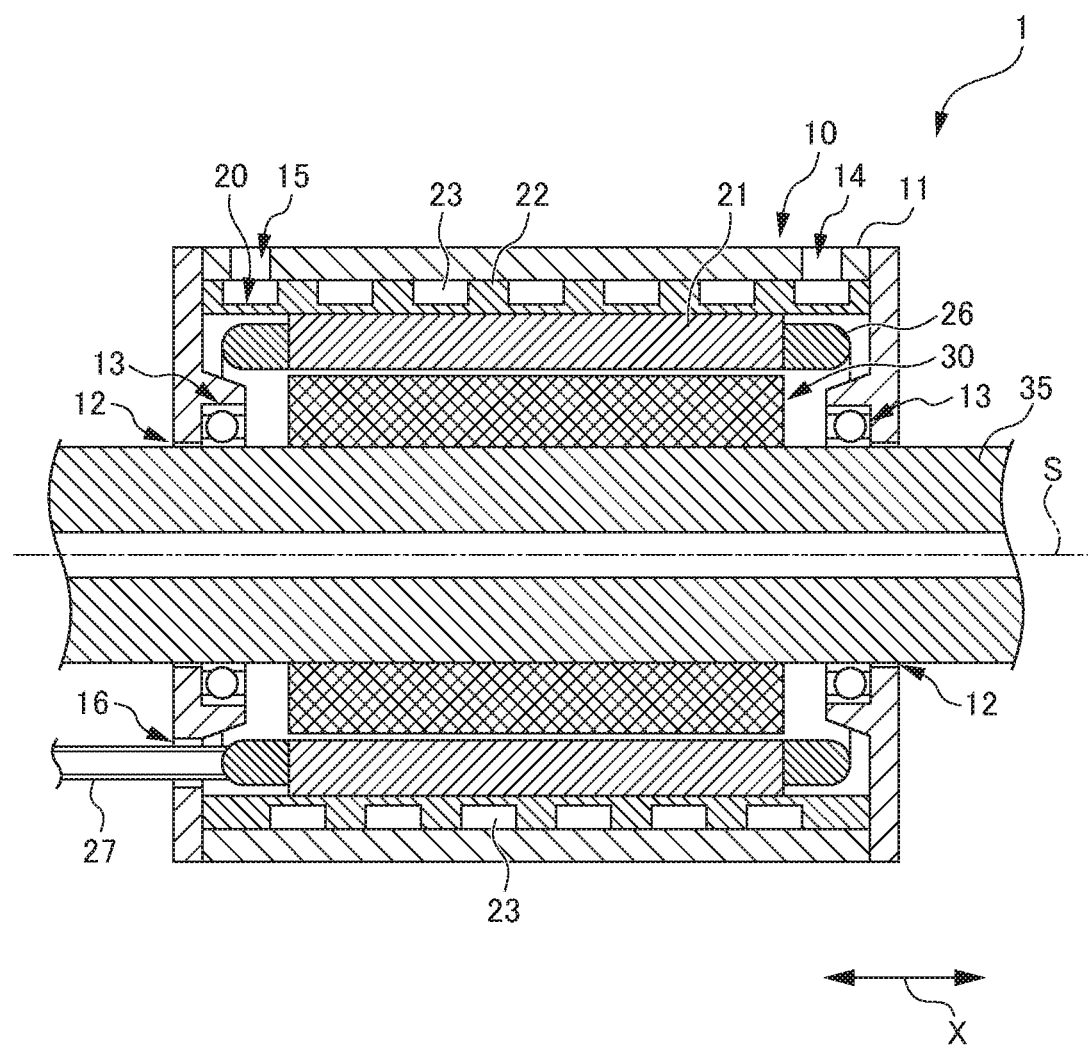
FIG. 1 is a cross-sectional view showing the configuration of a motor 1 in a first present embodiment.

Embodiments of the present invention will be described below. Drawings attached to the present specification are all schematic views, and with consideration given to ease of understanding and the like, the shapes, the scales, the vertical and horizontal dimensional ratios and the like of individual portions are changed or exaggerated from the real things. In the drawings, hatching which indicates the cross sections of members is omitted as necessary. In the present specification and the like, terms which specify shapes, geometric conditions and the extents thereof, for example, terms such as "parallel" and "directions" include not only the strict meanings of the terms but also the range of the extent to which they are regarded as being substantially parallel and the range of the extent to which they are regarded as being substantially the same directions.

In the present specification and the like, a line serving as the rotation center of a rotary axis 35 which will be described later is referred to as a "rotary axis line S", and a direction along the rotary axis line S is also referred to as a "rotary axis direction". The "rotary axis line S" and the "rotary axis direction" are also applied to the individual portions of a rotor such as a sleeve, permanent magnets and a sheath tube. In the present specification and the like, a direction parallel to the rotary axis line S described above is assumed to be an X direction. The rotary axis direction is also referred to as a "rotary axis direction X".

First Embodiment

A motor 1 serving as a rotary electrical machine which includes the rotor 30 of a first embodiment will first be described. The configuration of the motor 1 is the same as in the other embodiments which will be described later. FIG. 1 is a cross-sectional view showing the configuration of the motor 1 in the first present embodiment. The configuration of the motor 1 shown in FIG. 1 is an example, and as long as the rotor 30 of the first embodiment can be applied, any configuration may be adopted.

As shown in FIG. 1, the motor 1 includes, as main configuration requirements, a frame 10, a stator 20, the rotor 30 and the rotary axis 35. The frame 10 is an exterior member of the motor 1, and includes a frame main body 11, an axis hole 12 and a bearing 13.

The frame main body 11 is an enclosure which surrounds and holds the stator 20. The frame main body 11 holds the rotor 30 through the bearing 13. The frame main body 11 includes a supply port 14, a discharge port 15 and a hole portion 16. The supply port 14 is an opening for supplying a coolant to a flow path 23 in the stator frame 22 and is connected to a supply pipe (unillustrated) for the coolant. The discharge port 15 is an opening for discharging the coolant circulated along the flow path 23, and is connected to a discharge pipe (unillustrated) for the coolant. The hole portion 16 is an opening through which a power line 27 drawn from an iron core 21 is passed.

The axis hole 12 is a hole through which the rotary axis 35 (which will be described later) is passed. The bearing 13 is a member which rotatably supports the rotary axis 35. The stator 20 is a composite member which forms a rotary magnetic field for rotating the rotor 30. The stator 20 is formed in the shape of a cylinder as a whole, and is fixed within the frame 10. The stator 20 includes the iron core 21 and the stator frame 22.

The iron core 21 is a member inside which a winding 26 can be arranged. The iron core 21 is formed in the shape of a cylinder and is arranged inside the stator 20. In the inside surface of the iron core 21, a plurality of grooves (unillustrated) are formed, and the winding 26 is arranged in the grooves. Parts of the winding 26 are protruded from both end portions of the iron core 21 in the axial direction of the iron core 21. For example, the iron core 21 is produced by stacking a plurality of thin plates such as electromagnetic steel plates so as to form a multilayer member and integrating the multilayer member such as by adhesion or crimping.

The stator frame 22 is a member which holds the iron core 21 thereinside. The stator frame 22 is formed in the shape of a cylinder, and is arranged outside the stator 20. The iron core 21 is securely joined to the stator frame 22 in order to receive a reaction force generated by the torque of the rotor 30. As shown in FIG. 1, the stator frame 22 of the present embodiment includes the flow path 23 for cooling heat transmitted from the iron core 21 in the outside surface. The flow path 23 is a spiral groove of one or a plurality of threads formed in the outside surface of the stator frame 22. The coolant (unillustrated) supplied from the supply port 14 of the frame main body 11 (the frame 10) is circulated within the flow path 23 spirally along the outside surface of the stator frame 22, and is thereafter discharged from the discharge port 15 of the frame main body 11 to the outside.

The power line 27 which is electrically connected to the winding 26 is drawn from the iron core 21 of the stator 20. The power line 27 is connected to a power supply device (unillustrated) which is installed outside the motor 1. When the motor 1 is operated, for example, a three-phase alternating current is supplied to the iron core 21 so as to form the rotary magnetic field for rotating the rotor 30.

The rotor 30 is a component which is rotated by magnetic interaction with the rotary magnetic field formed by the stator 20. The rotor 30 is provided on the inner circumferential side of the stator 20. The configuration of the rotor 30 will be described later.

The rotary axis 35 is a member which supports the rotor 30. The rotary axis 35 is inserted so as to pass through the center of the axis of the rotor 30, and is fixed to the rotor 30. The rotary axis 35 is supported by the bearing 13 provided in the frame 10 rotatably about the rotary axis line S. The rotary axis 35 is also passed through the axis hole 12 and is connected to a power transmission mechanism, a deceleration mechanism or the like (none of which is illustrated) installed externally, for example, a cutting tool.

When in the motor 1 shown in FIG. 1, the three-phase alternating current is supplied to the stator 20 (the iron core 21), the rotary force is generated in the rotor 30 by magnetic interaction between the stator 20 where the rotary magnetic field is formed and the rotor 30, and the rotary force is output through the rotary axis 35 to the outside. Although in the present embodiment, the motor 1 is described as the SPM type synchronous motor discussed previously, the motor 1 may be, for example, an IPM (Interior Permanent Magnet) type synchronous motor.

Figure 2A:
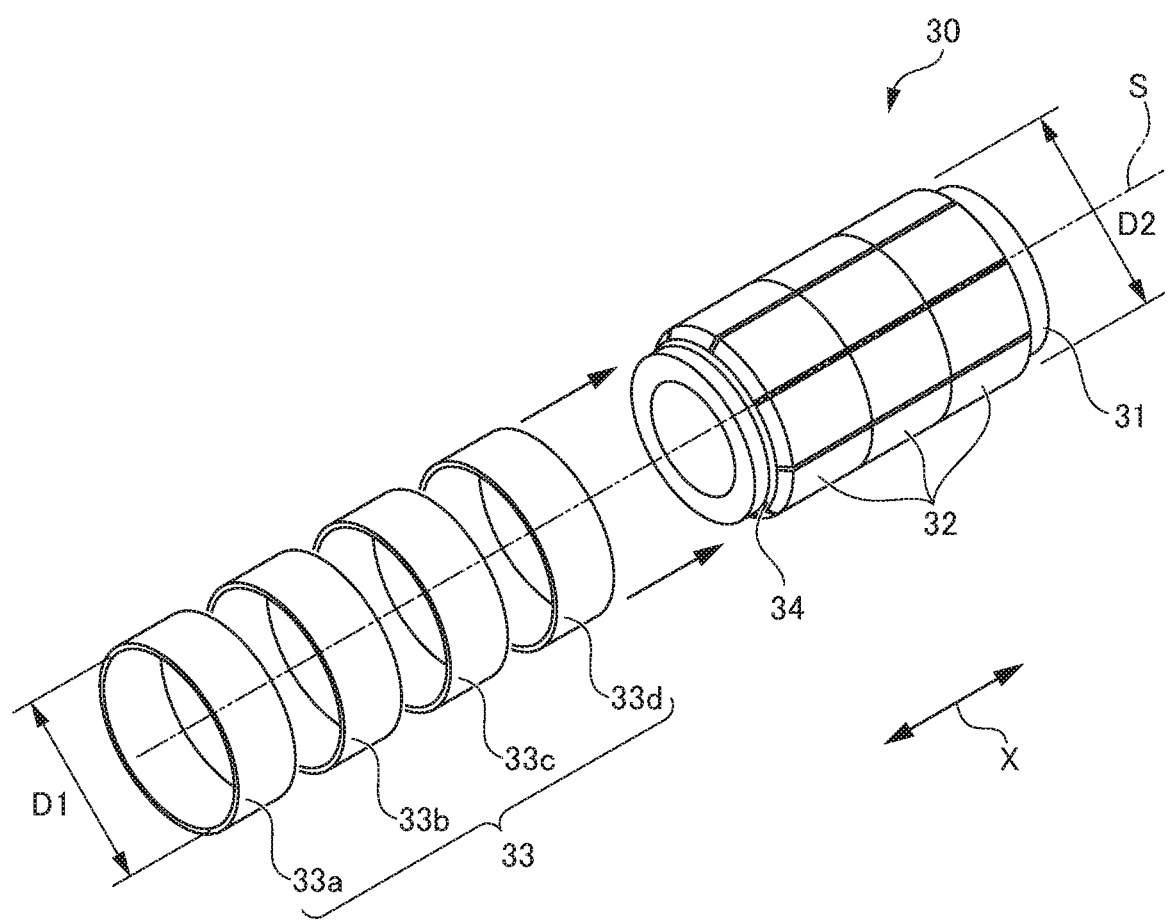
FIG. 2A is an exploded perspective view of a rotor 30.
Figure 2B:
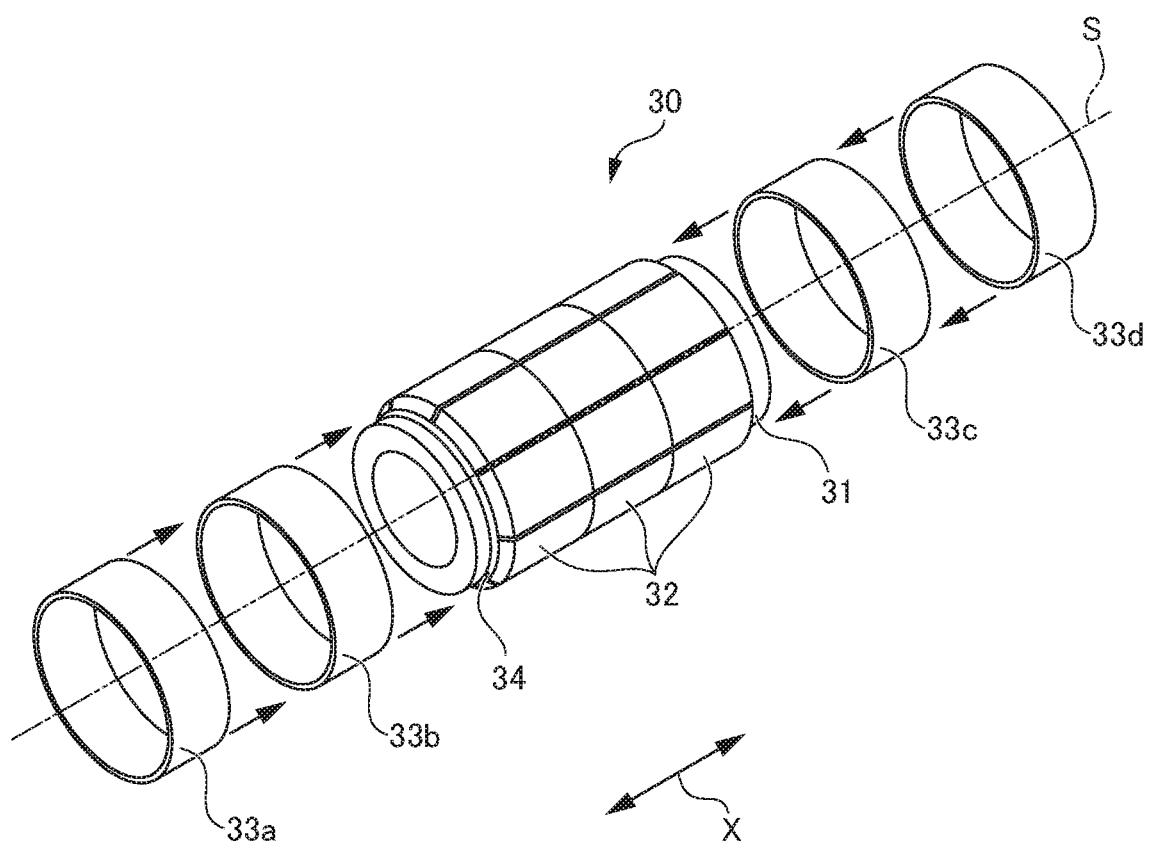
FIG. 2B is an exploded perspective view of the rotor 30.

The configuration of the rotor 30 will then be described. FIGS. 2A and 2B are exploded perspective views of the rotor 30. In FIGS. 2A and 2B, the basic configuration of the rotor 30 is the same. In the rotor 30 shown in FIG. 2B, a procedure for fitting sheath tube portions (which will be described later) to the rotor 30 differs from that in FIG. 2A. As shown in FIG. 2A, the rotor 30 includes a sleeve (rotary member) 31, permanent magnets 32 and a sheath tube 33.

The sleeve 31 is a member to which a plurality of permanent magnets 32 are attached and which is formed substantially in the shape of a cylinder, and is provided on the outer circumferential side of the rotary axis 35 (see FIG. 1). The sleeve 31 is formed of, for example, a magnetic material such as carbon steel. The rotor 30 which has the sleeve 31 on the inner circumferential side is fitted to the outer circumference of the rotary axis 35 by tight fitting.

The permanent magnets 32 are members for generating a magnetic field, and as shown in FIG. 2A, on the outer circumferential side of the sleeve 31, the permanent magnets in eight columns are provided along a circumferential direction (in FIG. 2A, only the permanent magnets in the four columns on the front side are shown). In the permanent magnets in the eight columns, N pole permanent magnets 32 and S pole permanent magnets 32 are alternately arranged in a circumferential direction of the sleeve 31. The permanent magnets 32 are adhered through an adhesive layer 34 to the outer circumferential surface of the sleeve 31. The permanent magnet 32 in each of the columns is divided into three parts along the rotary axis direction X of the rotor 30.

The sheath tube 33 is a cylindrical member for covering the permanent magnets 32. The sheath tube 33 is fitted to the outer circumferential surface of the permanent magnets 32 arranged on the sleeve 31. The sheath tube 33 of the present embodiment is divided into four parts along the rotary axis direction of the rotor 30. The sheath tube 33 is fitted to the outer circumferential surface of the permanent magnets 32, and thus it is possible to reduce the dropping off of the permanent magnets 32 from the rotor 30 by centrifugal force produced by the rotation of the rotor 30. Although in the present embodiment, the sheath tube 33 is directly fitted to the outer circumferential surface of the permanent magnets 32, the sheath tube 33 may be fitted to the outer circumferential surface of the permanent magnets 32 through, for example, an adhesive layer.

The sheath tube 33 can be formed, for example, by wrapping a CFRP fiber sheet around a tubular fixture (unillustrated) together with a resin. As the material of the sheath tube 33, in addition to the CFRP, for example, fiber-reinforced plastics, such as a glass fiber, an aramid fiber, a silicon carbide fiber, a boron fiber and a titanium alloy fiber, which have a high specific strength can be used. The sheath tube formed as described above is cut in the rotary axis direction X at a predetermined length, and thus it is possible to obtain a plurality of sheath tube portions which will be described later.

In a state where the sheath tube 33 is pressurized by a special fixture (unillustrated), the sheath tube 33 is inserted into the rotor 30 and is fitted to the rotor 30 by a contraction force corresponding to an interference. In this way, on the sheath tube 33, a reaction force (hereinafter also referred to as a "contraction force") large enough to hold the permanent magnets 32 acts against the centrifugal force produced by the rotation of the rotor 30 inward in a radial direction. As described above, in the sheath tube 33, the contraction force acts inward in the radial direction, and thus the dropping off of the permanent magnets 32 from the rotor 30 by the centrifugal force is reduced. The "inward in the radial direction" refers to a direction in which to approach the rotary axis line S from the outside of the rotor 30.

As shown in FIG. 2A, the interference refers to a dimension (D2−D1) obtained by subtracting the inside diameter D1 of the sheath tube 33 before being fitted from the outside diameter D2 of the permanent magnets 32 arranged on the sleeve 31. Although as the interference is increased, it is more difficult to fit the sheath tube 33 to the outer circumferential surface of the permanent magnets 32, it is possible to make a larger contraction force act inward in the radial direction from the fitted sheath tube 33.

Figure 3:
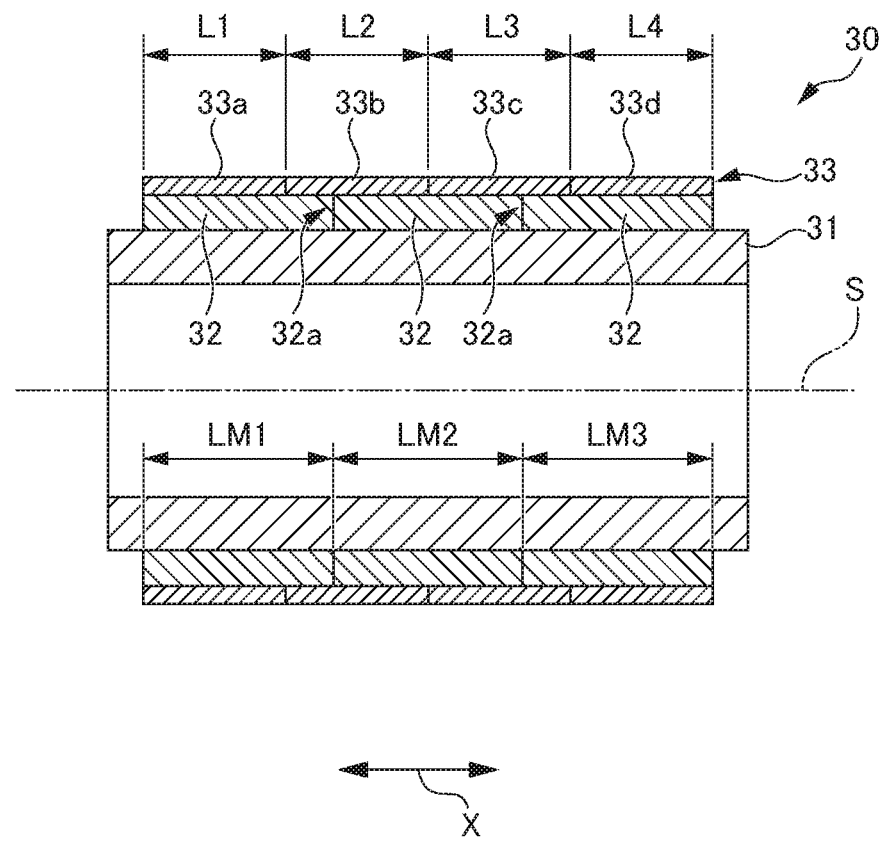
FIG. 3 is a cross-sectional view showing the configuration of a sheath tube 33 in the first embodiment.

The configuration of the sheath tube 33 will then be described. FIG. 3 is a cross-sectional view showing the configuration of the sheath tube 33 in the first embodiment. FIG. 3 shows a cross section taken along the rotary axis line S of the rotor 30. In FIG. 3 and FIGS. 4 to 6, the adhesive layer 34 and the like are omitted.

As shown in FIG. 3, the sheath tube 33 of the first embodiment is divided into four parts along the rotary axis direction X of the rotor 30. In other words, the sheath tube 33 is divided by a division number which exceeds the division number of the permanent magnet 32. Here, a description will be given with the assumption that the four parts obtained by dividing the sheath tube 33 are sheath tube portions 33a, 33b, 33c and 33d. The sheath tube portions 33a to 33d are also simply referred to as the "sheath tube portions".

As shown in FIG. 3, in the present embodiment, the lengths L1, L2, L3 and L4 of the individual sheath tube portions in the rotary axis direction are formed so as to be equal to each other (L1=L2=L3=L4). The lengths L1 to L4 of the individual sheath tube portions are set less than the lengths (LM1, LM2 and LM3) of the divided permanent magnets 32 in the rotary axis direction. The lengths LM1, LM2 and LM3 may be equal to each other (LM1=LM2=LM3) or may be different from each other.

For example, as shown in FIG. 2A, the sheath tube portions are fitted to the sleeve 31 in the order of the sheath tube portions 33d, 33c, 33b and 33a. For example, as shown in FIG. 2B, in order for a moving distance to be reduced, the sheath tube portions may be fitted to the sleeve 31 in the order of the sheath tube portions 33b, 33a, 33c and 33d. In the sheath tube 33, the sheath tube portion 33b covers a boundary portion 32a of the permanent magnets 32 divided into three parts. The sheath tube portion 33c covers a boundary portion 32b of the permanent magnets 32 divided into three parts.

In the rotor 30 of the first embodiment described above, even when the thicknesses of the divided permanent magnets 32 are not uniform, the contact area of the divided permanent magnets 32 and the sheath tube portions can be increased. Hence, in the rotor 30 of the first embodiment, a plurality of permanent magnets 32 arranged on the outer circumferential side of the sleeve 31 can be more securely held.

For example, a case where in FIG. 3, the thickness of the permanent magnet 32 arranged in the center of the rotor 30 in the rotary axis direction X is smaller than the thicknesses of the permanent magnets 32 arranged at both ends in the rotary axis direction will be considered. In this case, a step is produced between the permanent magnet 32 arranged in the center of the rotor 30 in the rotary axis direction and the two permanent magnets 32 arranged at both ends. Hence, it can be considered that if a long sheath tube extending in the rotary axis direction is fitted to the rotor 30, the contact area of the permanent magnet 32 and the sheath tube around the center is reduced, and thus the contraction force of the sheath tube is unlikely to act.

On the other hand, in the rotary axis direction X of the rotor 30, the sheath tube 33 of the first embodiment is divided by the division number which exceeds the division number of the permanent magnet 32. Hence, even when in FIG. 3, the thickness of the permanent magnet 32 arranged in the center of the rotor 30 in the rotary axis direction is smaller than the thicknesses of the permanent magnets 32 arranged at both ends in the rotary axis direction, the two sheath tube portions 33b and 33c can be brought into contact with the permanent magnet 32 arranged in the center. In this way, the contact area of the permanent magnet 32 arranged in the center and the sheath tube 33 is increased, and thus it is possible to more efficiently make the contraction force of the sheath tube 33 act. Hence, in the rotor 30 of the first embodiment, even when the thickness of the permanent magnet 32 arranged in the center is smaller than the thicknesses of the others, the divided permanent magnets 32 can be more securely held.

On the other hand, when the thickness of the permanent magnet 32 arranged in the center of the rotor 30 in the rotary axis direction X is thicker than the thicknesses of the permanent magnets 32 arranged at both ends in the rotary axis direction, the two sheath tube portions 33a and 33d can be brought into contact with the permanent magnets 32 arranged at both ends. In this way, the contact area of the permanent magnets 32 arranged at both ends and the sheath tube 33 is increased, and thus it is possible to more efficiently make the contraction force of the sheath tube 33 act. Hence, in the rotor 30 of the first embodiment, even when the thickness of the permanent magnet 32 arranged in the center is thicker than the thicknesses of the others, the divided permanent magnets 32 can be more securely held.

In the rotor 30 of the first embodiment, the length of each of the divided sheath tube portions (sheath tube 33) in the rotary axis direction X is shorter than the length of each of the divided permanent magnets 32. Hence, as shown in FIG. 2B, when the sheath tube portion is fitted to the rotor 30, the sheath tube portion can be fitted from both ends of the rotor 30 (X direction), and thus it is possible to shorten the distance over which each of the sheath tube portions is moved to a predetermined position. In this way, when the sheath tube portions are fitted to the rotor 30, the outer circumferential surface of the rotor 30 is bought into contact with the inner circumferential surface of the sheath tube portions, and thus it is possible to shorten the distance over which the sheath tube portions are cut, with the result that it is possible to decrease a reduction in the quality of the sheath tube 33. It is also possible to reduce a failure in which when the sheath tube portion is fitted to the rotor 30, the sheath tube portion is deformed so as to have a lower strength or the sheath tube portion is damaged. Hence, it is possible to enhance the reliability of the motor 1 including the rotor 30.

In the rotor 30 of the first embodiment, the divided sheath tube portions are short in length in the rotary axis direction. Hence, a cutting residue produced when the sheath tube portions are moved on the outer circumferential surface of the rotor 30 is unlikely to be left between the permanent magnets 32 and the sheath tube portions. Hence, it is possible to decrease a variation in the fixing force of the sheath tube 33 caused by a difference between the amounts of cutting residue left between the permanent magnets 32 and the sheath tube portions.

When the sheath tube portions are fitted, the cutting residue is unlikely to be left between the permanent magnets 32 and the sheath tube portions, and thus the interference of the sheath tube 33 is prevented from being substantially increased by the cutting residue left between the permanent magnets 32 and the sheath tube portions. Hence, it is possible to reduce an increase in friction force produced between the permanent magnets 32 and the sheath tube portions when the sheath tube portions are fitted to the rotor 30.

In the rotor 30 of the first embodiment, when the sheath tube portions are fitted to the rotor 30, the sheath tube portions are unlikely to be cut, and thus interferences of the individual sheath tube portions can be kept substantially equal to each other in the rotary axis direction X of the sheath tube 33. In the rotor 30 of the first embodiment, when the sheath tube portions are fitted to the rotor 30, the sheath tube portions are unlikely to be cut, and thus the sheath tube portions can be fitted with the larger interference. In this way, the permanent magnets 32 can be held with a larger reaction force against the centrifugal force produced by the rotation, and thus it is possible to effectively reduce the dropping off of the permanent magnets 32 from the rotor 30 by the centrifugal force and the displacement of the permanent magnets 32 in the circumferential direction by inertial force.

In the rotor 30 of the first embodiment, when the sheath tube portions are fitted to the rotor 30, the sheath tube portions are unlikely to be cut, and thus it is possible to reduce the thickness of the sheath tube 33. In this way, it is possible to decrease the total weight of the sheath tube 33, and thus it is possible to more decrease an influence exerted on the rotation performance of the rotor 30. The thickness of the sheath tube 33 is reduced, and thus it is possible to more narrow a gap between the rotor 30 and the stator 20 (see FIG. 1), with the result that it is possible to reduce a decrease in the torque efficiency of the motor 1. Hence, it is possible to more enhance the motor performance of the motor 1. In the rotor 30 of the first embodiment, when the sheath tube portions are fitted to the rotor 30, the sheath tube portions are unlikely to be cut, and thus even when the dimension of the rotor 30 in the rotary axis direction is long, the sheath tube portions whose thickness is small can be fitted with the sufficient interference.

In the rotor 30 of the first embodiment, the sheath tube portions 33b and 33c respectively cover the boundary portions 32a and 32b of the permanent magnets 32. Hence, even when warpage occurs in the boundary portions 32a and 32b of the permanent magnets 32, the boundary portions 32a and 32b of the permanent magnets 32 can be brought into intimate contact with the sleeve 31 (see FIG. 2A) more reliably.

In the rotor 30 of the first embodiment, the lengths L1, L2, L3 and L4 of the individual sheath tube portions in the rotary axis direction X are formed so as to be equal to each other. In this way, the components can be shared, and thus it is possible to reduce the cost. The sheath tube portions in which the length and inside and outside diameters are in conformance with the same standards are in stock, and thus it is possible to appropriately cope with a rapid increase in the production of the rotor 30, with the result that it is possible to enhance the productivity.

Second Embodiment

Figure 4:
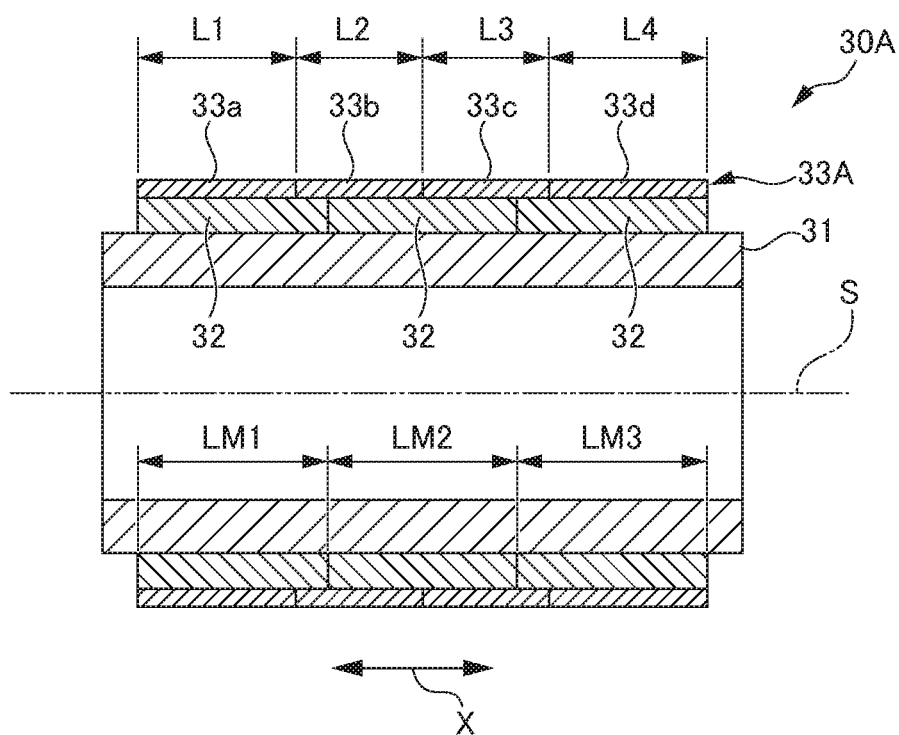
FIG. 4 is a cross-sectional view showing the configuration of a sheath tube 33A in a second embodiment.

FIG. 4 is a cross-sectional view showing the configuration of a sheath tube 33A in a second embodiment. FIG. 4 shows a cross section taken along the rotary axis line S of the rotor 30. In the description and drawings of the second embodiment, the same members and the like as in the first embodiment are identified with the same reference numerals as in the first embodiment or by adding symbol A to the ends, and the repeated description thereof will be omitted as necessary.

As shown in FIG. 4, in the rotor 30A of the second embodiment, the lengths L1, L2, L3 and L4 of the individual sheath tube portions (the sheath tube 33A) in the rotary axis direction X are formed so as not to be equal to each other. Specifically, the lengths L2 and L3 of the sheath tube portions 33b and 33c are set shorter than the lengths L1 and L4 of the sheath tube portions 33a and 33b. The lengths L1 and L4 of the sheath tube portions 33a and 33b are formed so as to be equal to each other. Likewise, the lengths L2 and L3 of the sheath tube portions 33b and 33c are formed so as to be equal to each other. The lengths L1 to L4 of the individual sheath tube portions are set less than the lengths (LM1, LM2, and LM3) of the divided permanent magnets 32 in the rotary axis direction.

In the rotor 30A of the second embodiment described above, the lengths L2 and L3 of the sheath tube portions 33b and 33c where the distance over which the sheath tube portions are moved in the rotary axis direction X is increased when the sheath tube portions are fitted to the rotor 30A are set shorter than the lengths L1 and L4 of the sheath tube portions 33a and 33d where the distance over which the sheath tube portions are moved in the rotary axis direction is decreased. In this way, when the sheath tube portions are fitted to the rotor 30A, in the sheath tube portions 33b and 33c, a cutting residue produced when they are moved on the outer circumferential surface of the rotor 30A is unlikely to be left. Hence, the permanent magnets 32 can be more uniformly fixed over the total length of the rotor 30A in the rotary axis direction.

Third Embodiment

Figure 5:
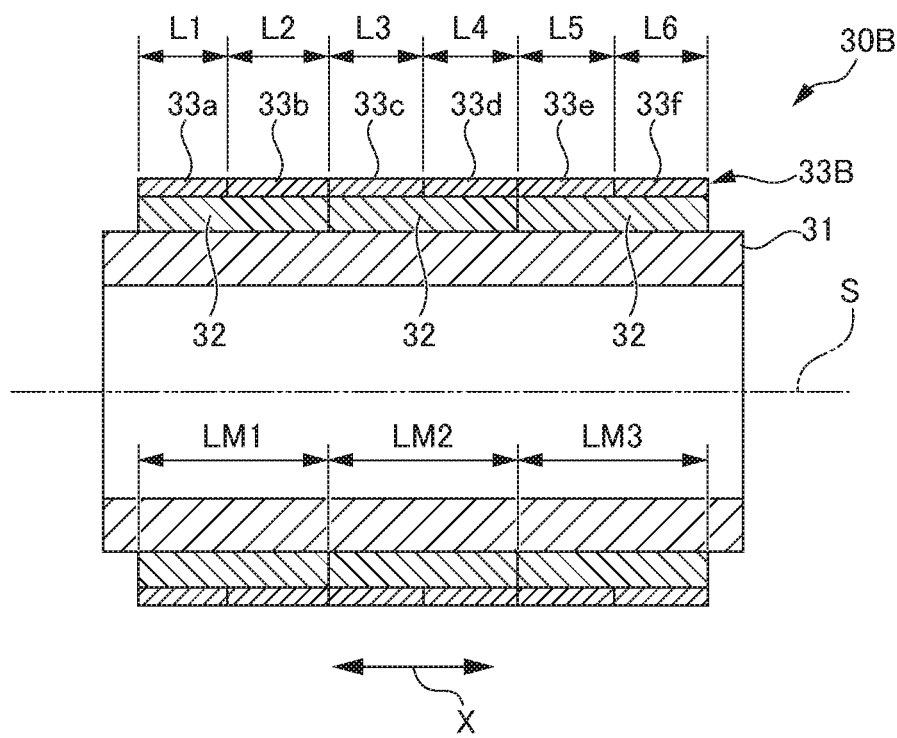
FIG. 5 is a cross-sectional view showing the configuration of a sheath tube 33B in a third embodiment.

FIG. 5 is a cross-sectional view showing the configuration of a sheath tube 33B in a third embodiment. FIG. 5 shows a cross section taken along the rotary axis line S of a rotor 30B. In the description and drawings of the third embodiment, the same members and the like as in the first embodiment are identified with the same reference numerals as in the first embodiment or by adding symbol B to the ends, and the repeated description thereof will be omitted as necessary.

As shown in FIG. 5, in the rotor 30B of the third embodiment, the sheath tube 33B is divided into six parts. Here, a description will be given with the assumption that the six parts obtained by dividing the sheath tube 33 are sheath tube portions 33a, 33b, 33c, 33d, 33e and 33f. The lengths L1, L2, L3, L4, L5 and L6 of the individual sheath tube portions 33a, 33b, 33c, 33d, 33e and 33f are formed so as to be equal to each other. Each of the lengths L1 to L6 of the individual sheath tube portions is set to half of each of the lengths LM1, LM2 and LM3) of the divided permanent magnets 32 in the rotary axis direction X. Hence, two adjacent sheath tube portions cover one divided permanent magnet 32 respectively. On the other hand, the individual sheath tube portions do not cover any of the boundary portions 32a and 32b of the divided permanent magnets 32.

In the rotor 30B of the third embodiment described above, when the thickness of the permanent magnet 32 arranged in the center of the rotor 30B in the rotary axis direction X is smaller than the thicknesses of the permanent magnets 32 arranged at both ends in the rotary axis direction, the inside diameters of the sheath tube portions 33c and 33d are decreased, and thus the permanent magnets 32 arranged in the center in the rotary axis direction can be more securely held.

On the other hand, when the thickness of the permanent magnet 32 arranged in the center of the rotor 30B in the rotary axis direction X is larger than the thicknesses of the permanent magnets 32 arranged at both ends in the rotary axis direction, the inside diameters of the sheath tube portions 33a, 33b, 33e and 33f are decreased, and thus the permanent magnets 32 arranged at both ends in the rotary axis direction can be more securely held. As described above, in the rotor 30B of the third embodiment, the sheath tube portions do not cover the boundary portions of the divided permanent magnets 32. Hence, the inside diameters of the individual sheath tube portions are changed according to the thicknesses of the divided permanent magnets 32, and thus the divided permanent magnets 32 can be more securely held.

In a configuration shown in FIG. 5, the lengths L1 to L6 of the sheath tube portions 33a to 33f do not necessarily need to be equal to each other. For example, the sheath tube portions 33a and 33b and the sheath tube portions 33e and 33f may be individually formed integrally, and only the sheath tube portions 33c and 33d may be divided.

Fourth Embodiment

Figure 6:
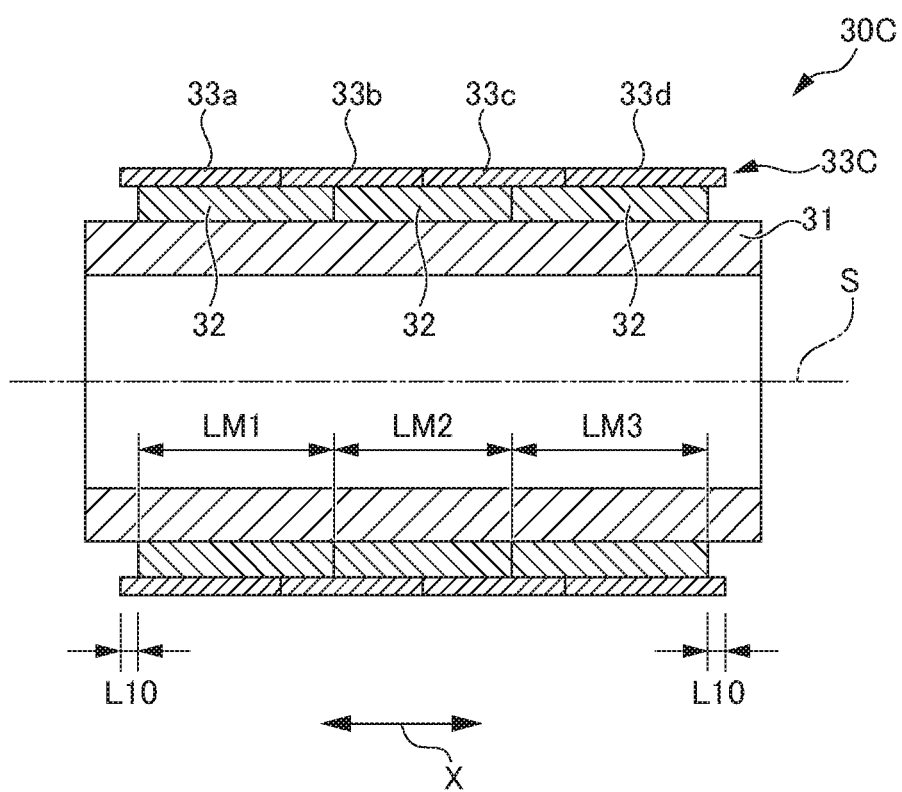
FIG. 6 is a cross-sectional view showing the configuration of a sheath tube 33C in a fourth embodiment.

FIG. 6 is a cross-sectional view showing the configuration of a sheath tube 33C in a fourth embodiment. FIG. 6 shows a cross section taken along the rotary axis line S of the rotor 30. In the description and drawings of the sixth embodiment, the same members and the like as in the first embodiment are identified with the same reference numerals as in the first embodiment or by adding symbol C to the ends, and the repeated description thereof will be omitted as necessary.

As shown in FIG. 6, in the rotor 30C of the fourth embodiment, the permanent magnet 32 is divided into three parts along the rotary axis direction X. The sheath tube 33C is divided into four parts along the rotary axis direction of the rotor 30. In the rotor 30C of the fourth embodiment, the division numbers of the permanent magnet 32 and the sheath tube 33 are equal to the division number in the first embodiment.

In the rotor 30C of the fourth embodiment, the end portions of the sheath tube portions 33a and 33d arranged at both ends in the rotary axis direction are protruded outward in the X direction with respect to the permanent magnets 32. In the rotary axis direction, a length L10 over which the end portions of the sheath tube portions 33a and 33d are protruded from the permanent magnets 32 is preferably set to, for example, about 1 to 10 mm though the length L10 depends on the size of the rotor 30C. Incidentally, when the length L10 is excessively increased, since the end portions of the sheath tube portions 33a and 33d are easily fluttered by wind pressure, it can be considered that the separation of the CFRP of the sheath tube portions is developed.

In the rotor 30C of the fourth embodiment, the end portions of the sheath tube portions 33a and 33d are protruded outward with respect to the permanent magnets 32, and thus even when warpage occurs in the outer end portions of the permanent magnets 32 arranged at both ends in the rotary axis direction X, the permanent magnets 32 can be brought into intimate contact with the sleeve 31 more reliably. In this way, the contact area of the permanent magnets 32 and the sleeve 31 can be acquired, and thus it is possible to increase a friction force therebetween. Hence, in the configuration of the fourth embodiment, it is possible to more effectively reduce the displacement of the permanent magnets 32 in the circumferential direction by inertial force while the rotor 30C is being rotated. In the configuration of the fourth embodiment, the permanent magnets 32 are not exposed to the outside of the rotor 30C, and thus it is possible to reduce the dropping off of the permanent magnets 312 outward in the radial direction by the centrifugal force produced by the rotation of the rotor 30C.

Although the embodiments of the present invention are described above, the present invention is not limited to the embodiments described above, various variations and modifications are possible as in variation forms which will be described later and they are also included in the technical scope of the present invention. The effects described in the embodiments are simply a list of most preferred effects produced from the present invention, and there is no limitation to the effects described in the embodiments. Although the embodiments described above and the variation forms which will described later can be used by being combined as necessary, the detailed description thereof will be omitted.

Variation Forms

Although in the present embodiment, the example where the permanent magnet 32 in each of the individual columns is divided into three parts along the rotary axis direction X is described, there is no limitation to this example. The permanent magnet 32 may be divided into two parts along the rotary axis line S of the rotor 30, may be divided into four parts or may be divided by a division number more than four.

Although in the embodiments, the example where the sleeve 31 is used as the rotary member of the rotor 30 is described, there is no limitation to this example. In a configuration in which the permanent magnets 32 are arranged on the outer circumferential side of the rotary axis 35 without the intervention of the sleeve 31, the rotary member may be the rotary axis 35.

Although in the embodiments, the example where the sheath tube 33 is formed of a carbon fiber-reinforced plastic (CFRP) is described, there is no limitation to this example. The sheath tube 33 may be formed of a fiber-reinforced plastic (FRP) previously illustrated or may be formed of a composite member whose main material is a fiber-reinforced plastic.

EXPLANATION OF REFERENCE NUMERALS

1: motor, 20: stator, 30, 30A, 30B, 30C: rotor, 31: sleeve (rotary member), 32: permanent magnet, 33, 33A, 33B, 33C: sheath tube, 33a to 33f: sheath tube portion, 35: rotary axis

What is claimed is:

1. A rotor comprising:
    a rotary member;
    permanent magnets in a plurality of columns which are arranged along a circumferential direction of the rotary member and each of which is divided into a plurality of permanent magnets in a rotary axis direction of the rotary member; and
    a sheath tube which is fitted to an outer circumferential side of the permanent magnets, which covers the permanent magnets and which is formed of a fiber-reinforced plastic,
    wherein the sheath tube is divided, in the rotary axis direction of the rotary member, by a division number which exceeds a division number of the permanent magnets,
    wherein the divided sheath tube covers only the permanent magnet, or covers only the permanent magnet and a boundary portion of the divided permanent magnet, and
    wherein at least one of the divided sheath tubes does not cover a boundary portion of the divided permanent magnets.

2. The rotor according to claim 1, wherein a length of each of the divided sheath tubes in the rotary axis direction is less than a length of each of the divided permanent magnets in the rotary axis direction.

3. The rotor according to claim 1, wherein lengths of the divided sheath tubes in the rotary axis direction are equal to each other.

4. The rotor according to claim 1, wherein at least one end portion of the sheath tube in the rotary axis direction is protruded outward with respect to one end portion of the permanent magnet in the rotary axis direction.

5. A rotary electrical machine comprising:
    the rotor according to claim 1; and
    a stator which is provided on an outer circumferential side of the rotor.

* * * * *